United States Patent

Katsuta

[11] 3,970,210
[45] July 20, 1976

[54] HEAT INSULATION LINED TANK FOR LOW TEMPERATURE LIQUIDS AND METHODS OF MANUFACTURING THE SAME

[75] Inventor: Kihei Katsuta, Nagasaki, Japan

[73] Assignee: Mitsubishi Jukogyo Kabushiki Kaisha, Japan

[22] Filed: June 12, 1973

[21] Appl. No.: 369,135

[30] Foreign Application Priority Data
June 27, 1972 Japan.............................. 47-64307
Apr. 23, 1973 Japan.............................. 48-45974

[52] U.S. Cl. .............................. 220/9 LG; 52/249; 52/404; 52/410; 220/15
[51] Int. Cl.² .................... B65D 87/24; B63B 25/08
[58] Field of Search............. 220/9 LG, 9 F, 10, 14, 220/15; 52/249, 364, 376, 404, 414, 407, 410, 378, 383, 224; 161/54–60, 70–72, 87, 92, 93, 151

[56] References Cited
UNITED STATES PATENTS

| 999,523 | 8/1911 | Rogers | 52/383 X |
|---|---|---|---|
| 2,326,010 | 8/1943 | Crom | 52/224 X |
| 3,206,057 | 9/1965 | Prew | 220/15 |
| 3,257,265 | 6/1966 | Isenberg | 220/9 LG X |
| 3,367,694 | 2/1968 | Witt | 52/410 X |
| 3,415,408 | 12/1968 | Seitz | 220/15 |
| 3,595,728 | 7/1971 | Robson | 52/407 |
| 3,647,606 | 3/1972 | Notaro | 161/53 X |
| 3,791,912 | 2/1974 | Allard | 161/60 X |
| 3,795,573 | 3/1974 | Smith et al. | 220/9 LG X |

FOREIGN PATENTS OR APPLICATIONS

| 1,289,071 | 2/1969 | Germany | 220/9 F |
| 951,923 | 3/1964 | United Kingdom | 220/9 LG |

Primary Examiner—William Price
Assistant Examiner—Stephen Marcus
Attorney, Agent, or Firm—McGlew and Tuttle

[57] ABSTRACT

A heat-insulation-lined tank for low-temperature liquids is composed of a foamed insulation layer secured to the inner wall surface of the tank to be insulated, a plurality of wires in layers assembled crosswise in a net-like fashion and embedded in the insulation, and a liquid tight layer or wall that covers the inner surface of the insulation, the spacings of the wires in net-like layers and of the layers themselves being made narrower on the low-temperature side or with the approach to the innermost layer of the lining. The tank has no possibility of cracking in the insulation layer due to thermal strains on exposure to low temperatures. A method of easily and satisfactorily manufacturing such an insulation-lined tank is also provided.

13 Claims, 6 Drawing Figures

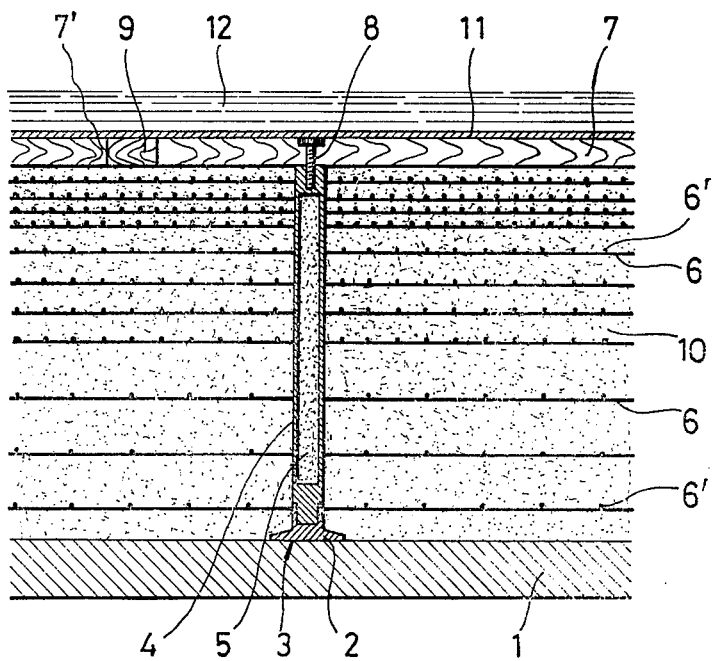
FIG. 1
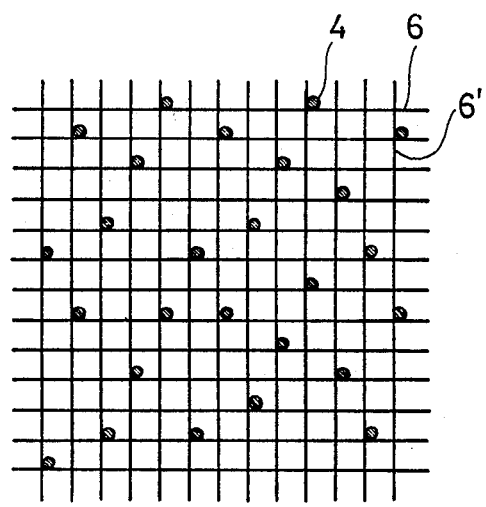
FIG. 3
FIG. 4

HEAT INSULATION LINED TANK FOR LOW TEMPERATURE LIQUIDS AND METHODS OF MANUFACTURING THE SAME

BACKGROUND OF THE INVENTION

This invention relates to a heat-insulation-lined tank having various advantages as a large-size storage tank for low-temperature liquids such as liquefied natural gases, and to a method of manufacturing the same.

For tanks handling liquified methane, a number of insulation linings have been proposed, but none has proved really practical. Tanks with heat-insulation coverings which are in wide use require a large volume of expensive structural steel for low-temperature service. This adds greatly to the construction cost of the tanks, and particularly of tankers for the transportation of liquefied natural gases at low temperatures.

OBJECTS OF THE INVENTION

The present invention is directed to the solution of the aforesaid problems concerning the thermal insulation of conventional tanks for low-temperature liquids. The invention thus has for its object the provision of a heat-insulation-lined tank and a method of manufacturing the same which can be advantageously applied to the handling of liquids such as liquefied natural gases at very low temperatures.

SUMMARY OF THE INVENTION

The object of the invention is realized by the construction of a heat-insulation-lined tank for low-temperature liquids characterized in that the tank wall to be thermally insulated is lined with a plurality of wires in layers assembled crosswise in networks and stretched substantially in parallel with the inner wall surface of the tank, an expanded insulation layer formed on the inner wall surface with the wire layers embedded therein, and a liquid tight layer or wall that covers the inner surface of the insulation, the spacings of the wires in the netted layers and of the layers themselves being made narrower on the low-temperature side or with the approach to the innermost wall or layer of the lining.

In the low-temperature-liquid tank according to this invention, the plurality of wires that consist of glass fiber strings or metal wires are stretched in the form of nets in parallel with the inner wall surface of the tank and are embedded in the insulation layer for its reinforcement. Moreover, the wires in nets and the nets themselves are spaced closer toward the innermost layer of the lining. This construction efficiently precludes the cracking of the insulation layer that might otherwise occur as a result of a change from the normal temperature after manufacture at the factory to the low temperature that is encountered in service.

Further, in accordance with the invention, a method of manufacturing the heat-insulation-lined tank for handling low-temperature liquids is provided and is characterized by spraying and foaming an expandable insulating material over the inner surface of the wall to be insulated, spraying short-staple glass fiber over the expanded ply or plies thus formed, stretching wires in a netlike pattern over the glass fiber ply or plies substantially in parallel with the inner surface of the outermost wall, and thereafter repeating the spraying and expanding of the insulating material, spraying of glass fiber, and stretching of wires, and finally forming a primary liquid tight wall as the innermost layer of the lining. In this manner a heat-insulating tank having a lining wherein a plurality of wire nets each consisting of short-staple glass fiber supported by a network of wires are embedded in multiple plies of an expanded heat-insulation layer, can be easily manufactured.

The above and other objects, advantages and features of the invention will become apparent from the following description taken in conjunction with the accompanying drawings showing embodiments thereof.

BRIEF DESCRIPTION OF DRAWINGS

FIG. 1 is a fragmentary sectional view of a heat-insulation lining for a low-temperature-liquid tank embodying the invention;

FIG. 3 is a view illustrating the distribution of bolts for supporting the insulation lining on the inner wall surface of the tank;

FIG. 4 is an enlarged vertical sectional view of one of the supporting bolts;

DESCRIPTION OF SPECIFIC EMBODIMENTS

Figure 2:
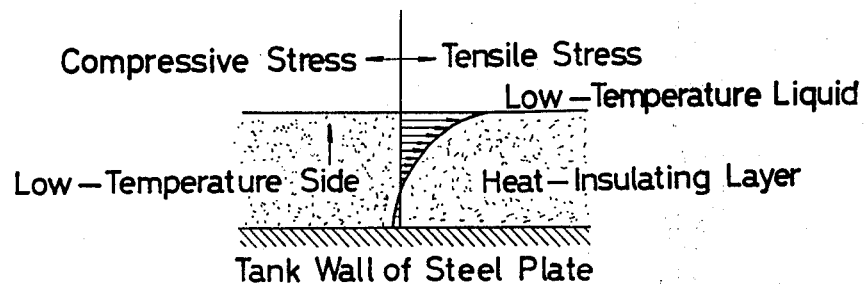
FIG. 2 is a stress distribution curve of the lining in which rigid polyurethane foam is employed as heat-insulating material.

With reference to FIGS. 1 to 4, the first embodiment of the invention will now be described. In FIG. 1 there is shown the outer wall portion of a tank 1 which may be of any shape suited for the intended use. The plate that forms the tank 1 is, for example, the steel plate usually employed as structural material for the construction of ships. A metal anchor or socket 2 serves as seat for supporting bolt 4 and is shown as spot welded at 3 to the inner side of outer wall of the tank 1.

Into this anchor 2 is screwed the lower end of the hollow supporting bolt 4, which in turn is filled with polyurethane foam or other heat-insulating material 5. Glass fiber strings or stainless steel wires 6, 6', which are coated with urethane resin, are supported and stretched by the bolts 4 in a plurality of layers in a netlike pattern parallel to the inner wall surface of the tank. The glass fiber strings or metal wires 6 and/or 6' are spaced apart in such a relation that, the farther the strings or wires are away from the inner side of the outer wall of the tank, or the nearer they approach the low-temperature side, the greater the density of the arrangement of the string or wire elements.

A sheet of plywood or synthetic resin board 7 is shown as secured to the head of the supporting bolt 4 by the screw 8. The board 7 is formed with an inlet 7', through which an expandable urethane solution is to be injected into the space between the board 7 and the steel 1 so that a heat-insulation layer 10 of rigid polyurethane foam can result. Subsequently the inlet 7' is closed fluid-tightly with a plug 9. The entire surface of the board 7 is covered with a multi-ply layer 11 of a reinforced synthetic resin built up of several plies of glass fiber and epoxy resin or polyurethane resin alternately laid one on another to keep the seams of the board 7 completely out of contact with the low-temperature liquid 12 to be handled.

A tendency generally observed in the use of rigid polyurethane foam as heat-insulating material is that, as indicated by the curve A in FIG. 2, tensile stress is increasingly produced on the low-temperature side whereas the stress diminishes as the temperature rises and slight compressive stress is created on the high-temperature side.

When using the rigid polyurethane foam as heat-insulating material, particularly as a lining, for tanks, it must be noted that without some countermeasure taken the thermal stresses of tension would be intense enough to cause cracks in the insulation layer.

With the foregoing in view, the heat-insulation-lined tank according to this invention is designed to prevent the cracking due to thermal stresses of the insulation layer by the networks of glass fiber strings or metal wires 6, 6' having a lower thermal contraction coefficient than that of the insulating material, arranged in parallel with the inner wall surface of the tank.

Also, persuant to this invention, the vertical spacings among the glass fiber strings or metal wires 6, 6' are made closer on the low-temperature side for added strength of the insulation layer 10.

The insulating structure of the invention proves particularly advantageous where a large tank, for example having a bottom area of 30 meters by 30 meters and a height of more than 20 meters, is to be lined completely. In the corners of such a huge tank thermal stresses can build up to a serious extent. This problem can be settled in accordance with the invention by free and ready choice of the structure and construction, for example by the use of glass fiber strings or metal wires 6, 6' stretched crosswise by the supporting bolts 4 and made gradually finer in meshes and shorter in net-to-net spaces inwardly.

Since the supporting bolts 4 are themselves good insulators, metal wires stretched thereby would cause transmission of heat merely in the direction parallel to the steel plate of the tank. In the diametral direction the transference of heat takes place only through the insulation layer 10 of rigid polyurethane foam and the supporting bolts 4. Stretching of the metal wires by and along the supporting bolts 4 is advantageous in that it helps equalize the temperature distribution per unit thickness of the insulation layer 10 and uniformalizes the stresses throughout the layer.

Desirably the arrangement of the supporting bolts 4 is staggered as shown in FIG. 3, so that the spacings among the glass fiber strings or metal wires 6, 6' can be freely chosen.

As illustrated in FIG. 4, hooks 13 may be provided on the supporting bolts 4 to facilitate the stretching of the strings or wires therealong.

It is known that polyurethane foam applied by spray foaming, continuous expansion, or other conventional technique can usually serve the purpose of heat insulation for objects at temperatures down to about $-100°C$. Therefore, a heat-insulating effect efficient and economical as a whole will be achieved by providing the insulation for the temperatures down to that level in the conventional way and then providing an insulation for lower temperatures in accordance with the present invention.

Another embodiment of the invention will be described hereunder in connection with FIGS. 5 and 6.

Here the supporting bolts of the first embodiment that demand much labor for use are dispensed with and the wire layers are arranged in a modified way to minimize the danger of craking in the insulation layer. In this embodiment a secondary liquid tight layer or wall is provided in parallel with, and in a spaced relationship with, the inner surface of the tank wall, and an insulation structure is built inwardly of the secondary liquid tight layer or wall.

Figure 5:
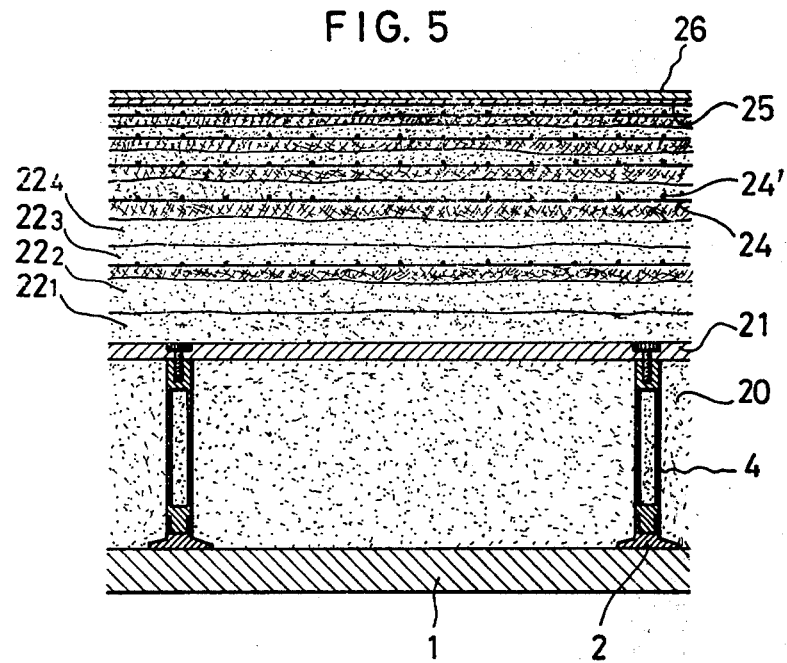
FIG. 5 is a fragmentary sectional view of another form of heat-insulation lining embodying the invention.
Figure 6:
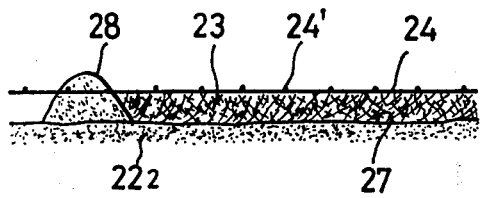
FIG. 6 is a detail sectional view of the insulation lining of FIG. 5 illustrating the construction of the lining.

In FIGS. 5 and 6, the parts similar to those used in FIGS. 1 to 4 are designated by like numerals and their detailed explanation is omitted.

Referring to FIG. 5, the numeral 21 indicates a secondary liquid tight wall supported by bolts 4 parallelly and in a spaced relationship with an inner hull 1 of a ship. Into the space between the liquid tight wall 21 and inner hull 1 is injected a solution of heat-insulating material 20, for example, of rigid urethane for subsequent expansion. The secondary liquid tight wall 21 and insulating material 20 may be prefabricated together in the form of panels at the factory, so that the panels may be assembled on site.

An expandable solution of rigid urethane is sprayed and foamed over the inner surface of the secondary liquid-tight wall 21, thus forming heat-insulation piles $22_1$, $22_2$.

Short-staple glass fiber 23 is loosened and scattered over the foamed insulation plies $22_1$, $22_2$. Wires 24, 24' are stretched crosswise in a netlike pattern over the layer of glass fiber 23, and then another insulation ply $22_3$ is formed by spray foaming, with the result that the wire layers 24, 24' are set in the insulation ply $22_3$. In the manner described, the insulation and wire layers are alternately formed several times until a multi-ply insulation layer of a desired wall thickness can be obtained.

In order to form an innermost layer a foaming agent 25 containing short-staple glass fiber is sprayed over the insulation layer and the resulting mixture layer is further lined with a primary liquid-tight layer or wall 26 made of glass fiber fabric and a synthetic resin such as polyurethane resin.

In this second embodiment, as above described, the short-staple glass fiber 23 is laid over the spray-foamed insulation plies $22_1$, $22_2$, and the wires 24, 24' are stretched crosswise, and then another insulation ply is formed by spraying. As the last-mentioned ply takes shape by foaming, the short-staple glass fiber tends to float up but is kept from doing so by the network of wires 24, 24'. Consequently the network of wires are left embedded in the expanded insulation ply $22_3$. Here, excess polyurethane goes on expanding upward with the layers of wires 24, 24' held therein.

The layers of wires 24, 24' may be formed, alternatively, in the manner illustrated in FIG. 6. The surface 27 of the insulation ply $22_2$ formed by spray expansion is abraded and electrostatically charged by means of a synthetic resin brush, the short-staple glass fiber 23 is blown against and deposited on the statically charged surface, the wires 24, 24' are stretched crosswise in a netlike formation and temperarily secured in position by spot spraying of the expandale insulating material as at 28. Subsequently, a further insulation ply is formed by spray foaming in the same way as above described.

Here again the short-staple glass fiber floats up to the level of the wires 24, 24' and is secured in position in a unitary structure.

With the features described above, the present invention permits the use of ordinary steel plates in the construction of the tank outer wall 1, thus ensuring a substantial saving in cost. Furthermore, according to the invention, the spacings of glass fiber strings or metal wires in the form of nets parallel to the tank wall can be gradually shortened for efficient and sufficient reinforcement of the insulation layer to overcome the problem of thermal stresses to be encountered.

If wires and short-staple glass fiber are combinedly used in combination to form the wire layers, the resulting net-like structures may have coarse meshes because the glass fiber fills the meshes and provides a reinforcement of desired strength. For example, a network of wires which must have meshes of about 5 mm may have much coarser meshes of 20 mm instead when the wires are supplemented with glass fiber. An additional advantage associated with the use of metal wires as the netting material is that the temperature distribution in the horizontal direction of the insulation lining is made uniform and occurrence of any localized thermal stress in the lining can be avoided.

What is claimed is:

1. A storage tank for a low-temperature liquid comprising an outer tank shell wall having an interior surface, a liquid-impervious layer spaced from said interior surface of said tank shell wall, a heat insulation layer between said tank shell wall and said liquid-impervious layer, a multiplicity of wire net layers embedded in and extending across an insulation layer each being substantially parallel to and in spaced relation with said interior surface, said wire net layers each including crossing longitudinal and lateral wires defining mesh opening areas therebetween which decrease in size in a direction from said tank outer wall toward said liquid-impervious layer.

2. A storage tank structure particularly for use as a heat insulation lined tank for low temperature liquid comprising at least one wall having a plurality of alternate wire net and insulation layers at least adjacent the inner portion of the wall, said wire net layers comprising a plurality of longitudinal and transverse intersecting wires, the wire net layers being spaced apart from one another and being spaced progressively closer together toward one side of said wall, and the intersections of said longitudinal and transverse wires being spaced gradually closer to one another, progressively as said layers are spaced toward one side of the wall.

3. The structure according to claim 2, wherein at least one liquid tight layer is closest to the interior of said tank and adjacent the insulation layers for containing said insulation layers and separating said layers from the low temperature liquid in the tank.

4. The structure according to claim 3, wherein at least one bolt extends through the liquid tight layer.

5. The structure according to claim 4, wherein said bolt member comprises a hollow tube member.

6. The structure according to claim 5, wherein the said hollow tube member contains insulating material.

7. The structure according to claim 2, wherein the wire net layers are supported by a plurality of bolts extending from at least one side of said wall.

8. The structure according to claim 7, wherein said bolts extend into a socket which is fastened to the outer wall of the tank.

9. The structure according to claim 8, wherein the bolts are removably fastened adjacent to the liquid tight layer.

10. The structure according to claim 9, wherein the bolts are fastened to the liquid tight layer by screws.

11. The structure according to claim 8, wherein one end of each of said bolts is secured to the outer wall of the tank and the other end of each of the bolts is fastened to a first liquid tight layer, the outer wall has an insulation layer extending between the wall and the first liquid tight layer, the alternate wire net layers and insulation layers are adjacent the first liquid tight layer and a second liquid tight layer is adjacent said alternate wire net and insulating layers for containing said layers and separating said layers from low temperature liquid in said tank.

12. The structure according to claim 11, where said insulating layers are loose fibrous material.

13. The structure according to claim 7, wherein the bolts have a plurality of hooks for supporting the wire net layers.

* * * * *